United States Patent [19]

Chiba et al.

[11] Patent Number: 4,471,935
[45] Date of Patent: Sep. 18, 1984

[54] POWER UNIT MOUNT

[75] Inventors: Kazuo Chiba, Tokyo; Ryoichi Kanda, Inuyama, both of Japan

[73] Assignees: Nissan Motor Co. Ltd.; Tokai Rubber Industries, Ltd., both of Japan

[21] Appl. No.: 382,606

[22] Filed: May 24, 1982

[30] Foreign Application Priority Data

Jun. 3, 1981 [JP] Japan ................................ 56-84436

[51] Int. Cl.³ ............................................. F16F 1/38
[52] U.S. Cl. .................................. 248/638; 267/141.2
[58] Field of Search ............. 248/638, 632, 635; 267/141.2–141.7; 403/221, 225, 224, 228

[56] References Cited

U.S. PATENT DOCUMENTS

| 2,256,752 | 9/1941 | Saurer | 267/141.5 |
| 2,375,105 | 5/1945 | Hilg | 267/141.3 |
| 2,948,502 | 8/1960 | Hutton | 267/141 |
| 3,565,386 | 2/1971 | Lemkuill | 248/638 |
| 4,183,496 | 1/1980 | Brock et al. | 267/141.4 |
| 4,392,640 | 7/1983 | Kakimoto | 267/141.2 |

FOREIGN PATENT DOCUMENTS

| 137467 | 5/1979 | Austria | 267/141.3 |
| 817656 | 9/1937 | France . | |
| 887123 | 11/1943 | France . | |
| 54-45636 | 4/1979 | Japan . | |
| 56-63141 | 5/1981 | Japan | 267/141.2 |
| 1454145 | 10/1976 | United Kingdom . | |
| 2010438 | 6/1979 | United Kingdom . | |
| 1570751 | 7/1980 | United Kingdom . | |

Primary Examiner—Reinaldo P. Machado
Assistant Examiner—Alvin Chin-Shue
Attorney, Agent, or Firm—Leydig, Voit, Osann, Mayer & Holt Ltd.

[57] ABSTRACT

A power unit mount comprises a generally T shaped elastomeric member between an outer member and an inner member. The generally T shaped elastomeric member has two armed portions and a leg portion. Upon application of a static load due to the weight of a power unit, the leg portion is compressed and the arm portions lie in the horizontal plane.

7 Claims, 4 Drawing Figures

POWER UNIT MOUNT

BACKGROUND OF THE INVENTION

1. Field of the Invention

The present invention relates to a mount for mounting a power unit on a vehicle body.

2. Description of the Prior Art

A known mount for mounting a power unit on a vehicle body is illustrated in FIG. 1 wherein an inner member 2 is mounted with an outer member 4 by means of two elastomeric arms 3 radially extending from the inner member 2 to the outer member 4. In mounting the power unit on the vehicle body, a plurality of such mounts are located between the power unit and the vehicle body. The outer member 4 is fixedly secured to the vehicle body and the inner member 2 to the power unit. The setting is made such that the two elastomeric arms lie in a horizontal plane upon application of a static load due to the weight of the power unit. The mount 1 comprises two elastomeric restraining blocks 5 for preventing an excessively large displacement of the inner member 2 relative to the outer member 4. In operation, a small vibration of the power unit in the vertical direction causes the inner member 2 to displace in the vertical direction, applying a shear stress to the elastomeric arms 3. The spring constant of the elastomeric arms 3 under shear stress is smaller than the spring constant of the elastomeric arms 3 under compression stress. An excessively large displacement in the vertical direction of the inner member 2 is prevented by abutting engagement of the inner member 2 with one of the two elastomeric restraining blocks 5.

The spring constant of the elastomeric arms 3 varies with variation in the direction of the vibration as shown by broken line curve A in FIG. 2 wherein Y-axis indicates the vertical direction and X-axis the horizontal direction. Referring to the broken line A in FIG. 2, the spring constant in the vertical direction is $\alpha$(alpha) and the spring constant in a direction inclined from the vertical direction by an angle $\theta$(theta) is a. Apparently, the spring constant in the vertical direction is minimum and the spring constant in the inclined direction is larger than the spring constant $\alpha$(alpha) in the vertical direction.

It is necessary that the spring constant $\alpha$(alpha) in the vertical direction be set considering the weight of the power unit and be large enough for supporting it. The spring constant in the inclined direction becomes large accordingly, failing to effectively prevent small vibrations in the inclined direction.

If, the mount 1 is arranged such that the two elastomeric arms 3 lie in a plane perpendicular to the inclined direction of vibration, the spring constant in the inclined direction reduces, thus effectively preventing the small vibration in this inclined direction. With this arrangement, however, one of the elastomeric arms 3 is subject to a tensile stress, while, the other to a compression stress. The elastomeric arm 3 which is subject to the tensile stress is liable to crack quickly as compared to the other elastomeric arm 3, leading to a short operating life.

SUMMARY OF THE INVENTION

According to the present invention, there is provided a mount which has a small spring constant in an inclined direction from the vertical direction.

The mount according to the present invention comprises a generally T shaped elastomeric member having a hub portion fixedly coupled with an inner member, a radially extending leg portion from the inner member to an outer member, and two radially extending arm portions from the inner member to the outer member. The outer member is fixedly secured to one of a power unit and a vehicle body and the inner member is fixedly secured to the other. The leg portion lies in the vertical plane and, upon application of a static load due to the weight of the power unit, the arm portions generally lie in the horizontal plane and the leg portion is compressed.

BRIEF DESCRIPTION OF THE DRAWINGS

The invention is further described in connection with the accompanying drawings, wherein.

DESCRIPTION OF THE EMBODIMENT

Figure 3:
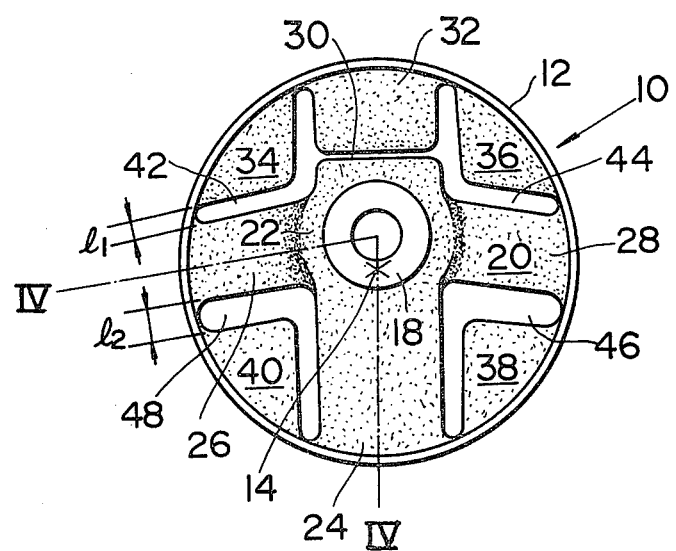
FIG. 3 is a schematic cross sectional view of an embodiment of a mount according to the present invention when it is in the free state.
Figure 4:
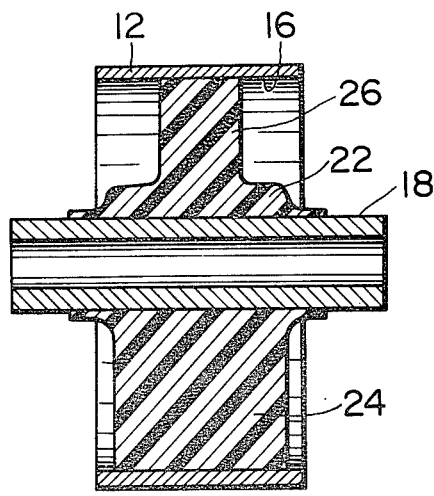
FIG. 4 is a sectional view taken along the line IV—IV in FIG. 3.

Referring to FIGS. 3 and 4, a mount generally indicated by 10 comprises an outer member in the form of a metal outer shell 12 having an axis 14 and a cylindrical inner wall 16, an inner member in the form of a metal inner tube 18 disposed within the outer member 12, and a generally T shaped elastomeric member 20 having a hub portion 22 fixedly coupled with the inner member 18, a leg portion 24 and two arm portions 26 and 28. The leg portion 24 and arm portions 26 and 28 are extending radially outwardly from the hub portion 22 and have respective ends fixedly adhered to the cylindrical inner wall 16 by a vulcanizing adhesive. The T shaped elastomeric member 20 is made of a rubber in this embodiment. In a free state as shown in FIG. 3, the leg portion 24 is not compressed and the arm portions 26 and 28 are displaced in a direction away from the leg portion 24 from a radial plane perpendicular to this direction. The T shaped elastomeric member 20 is formed with a flat surface 30 on the hub portion 22 facing and adapted to abut with an elastomeric restraining block 32 fixedly attached to the cylindrical wall 16.

During mounting a power unit on a vehicle body, a plurality of such mounts are used. The outer member 12 is in press fit within a hole of the bracket on the vehicle body, while, the inner member 18 receives a power unit supporting bar of the power unit. It is necessary that the mount unit 10 be arranged such that the leg portion lies in the vertical plane and, under application of a static load due to the weight of the power unit, the inner member 18 which has been in the displaced position is pushed downwardly as viewed in FIG. 3 toward the center axis 14. As a result, the leg portion 24 is compressed between the inner member 18 and the outer member 12 and the arm portions 26 and 28 lie generally in the horizontal plane. Preferably, the amount of displacement of the inner member 18 from the center axis 14 and an inclined angle of each of the arm portions 26 and 28 from the horizontal plane should be set such that, upon application of the static load, the axis of the inner member 18 assumes the center position near the center axis 14 and the arm portions 26 and 28 lie in the horizontal plane.

Spaces between the cylindrical inner wall 16 and T shaped elastomeric member 20 and the elastomeric restraining block 32 receive four generally triangular shaped elastomeric blocks 34, 36, 38 and 40 which are made of a rubber. The elastomeric blocks 34, 36, 38 and 40 are fixedly adhered to the cylindrical inner wall 16 of the outer member 12 by a vulcanizing adhesive. As shown in FIG. 3, four L shaped clearance spaces 42, 44, 46 and 48 are defined between the blocks 34, T shaped member 20 and the restraining block 32.

The width $L_1$ (as viewed in FIG. 3) of the upper two L shaped clearance spaces 42 and 44 is set smaller than the width $L_2$ of the lower two L shaped clearance spaces 46 and 48 when the mount 10 is in the free state to such an extent that the width $L_1$ becomes equal to the width $L_2$ upon application of the static load.

Figure 1:
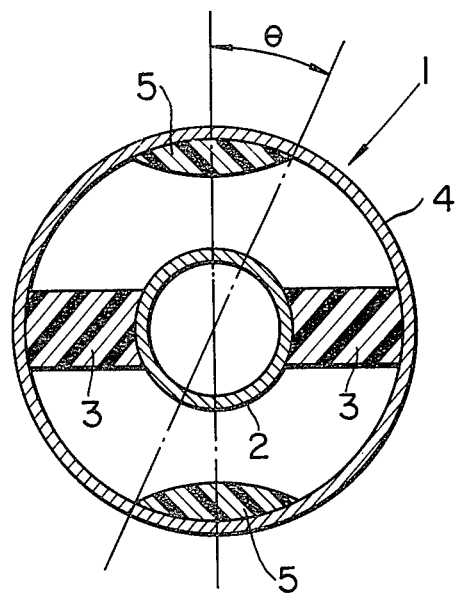
FIG. 1 is a schematic axial end view illustrating the just described known power unit mount.
Figure 2:
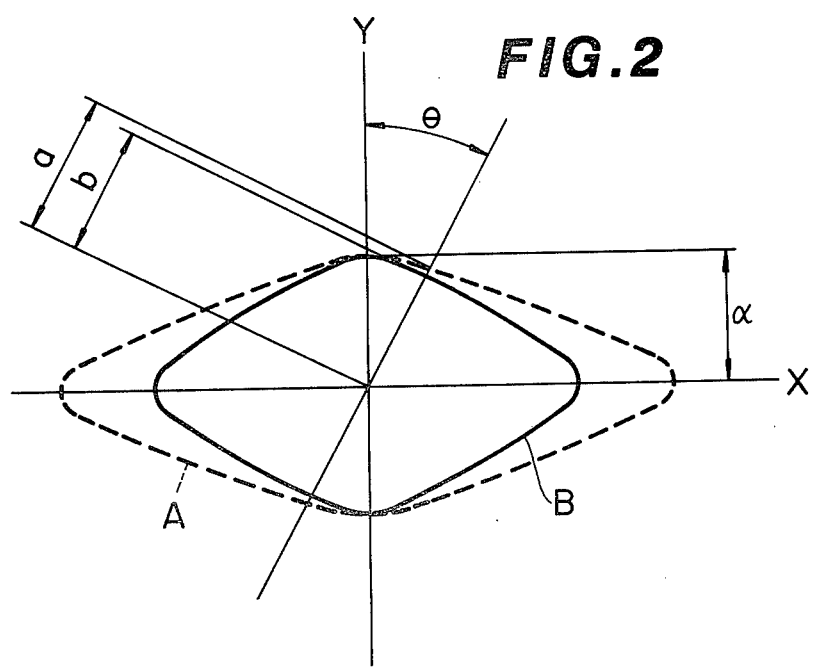
FIG. 2 shows spring constant vs., vibration incident direction curves.

The mount 10 shows the spring constant as shown by the solid line curve B in FIG. 2 upon application of the static load. As will be appreciated from FIG. 2, the spring constant b (see FIG. 2) which is provided by the mount 10 according to the present invention when it is subject to vibration in the direction inclined from the vertical direction by an angle $\theta$(theta) is smaller than The spring constant a (see FIG. 2) which is provided by the known mount 1 explained in connection with FIG. 1 with the spring constant in the vertical direction kept the same as that of the known mount 1.

In the case an excessively large force is applied, the generally T shaped elastomeric member 20 comes into abutting engagement with the elastomeric blocks 34, 36, 38 and 40, thus preventing an excessive displacement of the inner member 18 relative to the outer member 12.

The arrangement wherein the width $L_1$ is equal to the width $L_2$ under application of the static load provides stable vibration suppressing effect.

If desired, the arm portions 26 and 28 and leg portion 24 are preloaded radially even when the mounting unit 10 is in the free state. Even in this case the setting should be such that a space is formed between the flat surface 30 and the restraining block 32 under application of the static load. Preloading the arm portions 26 and 28 and leg portion 24 leads to a long operating life of the mount 10.

Although, in the preceding description, the inner member 18 is secured to the power unit and the outer member 12 to the vehicle body, the inner member may be secured to the bracket of the vehicle body and the outer member to the power unit supporting bar of the power unit. In the latter case, the mounting unit 10 is arranged such that the leg portion 24 extends upwardly so that the leg portion is compressed upon application of the static load due to the weight of the power unit. In other words, the mount 10 is used in a position turned upside down from the position illustrated in FIG. 3.

What is claimed is:

1. A mount for mounting a power unit on a vehicle body comprising:
    an outer member having a cylindrical inner wall with an axis, said outer member adapted to be fixedly secured to one of the power unit or the vehicle body;
    an inner member having a central axis disposed within said outer member, said central axis being parallel to and displaced from the axis of said cylindrical inner wall when said mount is in an unloaded state, said inner member adapted to be fixedly secured to the other one of the power unit or the vehicle body; and
    a symmetrical, generally T shaped elastomeric member having a hub portion fixedly coupled with said inner member, a leg portion extending radially outwardly from said hub portion and having an end fixed to the cylindrical inner wall of said outer member, said T shaped elastomeric member having two arm portions extending radially outwardly from said hub portion and having ends fixed to the cylindrical inner wall, respectively, said leg portion adapted to lie in a vertical plane and, upon application of a static load due to the weight of the power unit, said leg portion being compressed and said arm portions assuming a generally horizontal plane.

2. A mount as claimed in claim 1, further comprising an elastomeric restraining block secured within said outer member, said restraining block arranged to prevent an excessively large displacement of said inner member.

3. A mount as claimed in claim 2, wherein said generally T shaped elastomeric member and said elastomeric restraining block cooperate with the cylindrical inner wall of said outer member to define spaces, and further comprising generally triangular shaped elastomeric blocks disposed within said spaces, respectively, and fixed to the cylindrical inner wall of said outer member.

4. A mount as claimed in claim 3, wherein said generally T shaped elastomeric member and said elastomeric restraining block cooperate with said generally triangular shaped elastomeric blocks to define L shaped clearance spaces which have substantially equal width upon application of the static load.

5. A mount as claimed in claim 1 or 2 or 3 or 4, wherein said leg portion and said arm portions of said generally T shaped elastomeric member are preloaded radially between said outer member and said inner member.

6. A mount as claimed in claim 1 wherein, when said mount is in an unloaded state, said arms are displaced in a direction away from said leg portion and from a radial plane perpendicular to a direction in which said leg portion extends.

7. A mount as claimed in claim 1 wherein said leg has a width and length which are greater than the width and length of each of said arm portions, respectively.

* * * * *